United States Patent
Narita et al.

[19]

[11] Patent Number: 5,857,186
[45] Date of Patent: *Jan. 5, 1999

[54] PARALLEL MERGE SORTING APPARATUS WITH AN ACCELERATED SECTION

[75] Inventors: Yoshinori Narita; Takayuki Shibata, both of Tokyo, Japan

[73] Assignee: Nippon Steel Corporation, Tokyo, Japan

[*] Notice: The term of this patent shall not extend beyond the expiration date of Pat. No. 5,727,200.

[21] Appl. No.: 917,752

[22] Filed: Aug. 27, 1997

Related U.S. Application Data

[62] Division of Ser. No. 398,777, Mar. 6, 1995, Pat. No. 5,727,200.

[30] Foreign Application Priority Data

Mar. 7, 1994 [JP] Japan .................................. 6-064653

[51] Int. Cl.$^6$ .................................................. G06F 17/30
[52] U.S. Cl. .................................................................. 707/7
[58] Field of Search ........................................... 707/7

[56] References Cited

U.S. PATENT DOCUMENTS

| | | | |
|---|---|---|---|
| 5,142,687 | 8/1992 | Lary ........................................... | 707/7 |
| 5,179,699 | 1/1993 | Iyer et al. ................................. | 395/600 |
| 5,210,870 | 5/1993 | Baum et al. .............................. | 395/600 |
| 5,307,485 | 4/1994 | Bordonaro et al. ...................... | 395/600 |
| 5,386,583 | 1/1995 | Hendricks ................................. | 395/600 |
| 5,410,689 | 4/1995 | Togo et al. ............................... | 395/600 |
| 5,487,164 | 1/1996 | Kirchhofer et al. ..................... | 395/600 |
| 5,535,384 | 7/1996 | Kasahara ................................... | 707/7 |
| 5,727,200 | 3/1998 | Narita et al. ............................. | 707/7 |

FOREIGN PATENT DOCUMENTS 2-224018  9/1990  Japan .

OTHER PUBLICATIONS

Kruse, Data Structures and Program Design, Prentice–Hall, 1984, p. 139–145.

*Primary Examiner*—Wayne Amsbury
*Attorney, Agent, or Firm*—Pollock, Vande Sande & Priddy

[57] ABSTRACT

A sorting apparatus in which, while its scale is limited so as not to become large, all of base axis data supplied as its input are sorted in order, and, at the same time, the sorted base axis data are outputted in the sorted order. The sorting apparatus includes a plurality of sorter sections, a base axis data train divider section for supplying partial base axis data trains to these sorter sections, and a comparative result output section for merge/sorting (comparatively selecting) the results of sorting of the individual partial base axis data trains in the plural sorter sections and sequentially outputting the sorted ones of the base axis data in the sorted order. Thus, in the sorting apparatus, base axis data are divided into a plurality of partial base axis data trains, and, after the partial base axis data trains are partially concurrently sorted in the plural sorter sections, the base axis data are sequentially outputted from the comparative result output section in the sorted order.

12 Claims, 9 Drawing Sheets

FIG. 8A

| ORIGINAL DATA | |
|---|---|
| NO | |
| 1 | 1 |
| 2 | 6 |
| 3 | 5 |
| 4 | 4 |
| 5 | 5 |
| 6 | 9 |
| 7 | 2 |
| 8 | 3 |
| 9 | 5 |
| 10 | 7 |
| 11 | 9 |
| 12 | 6 |
| 13 | 7 |
| 14 | 5 |
| 15 | 7 |
| 16 | 8 |
| 17 | 0 |
| 18 | 1 |
| 19 | 5 |
| 20 | 6 |
| 21 | 7 |
| 22 | 3 |
| 23 | 8 |
| 24 | 2 |
| 25 | 4 |
| 26 | 6 |
| 27 | 8 |
| 28 | 7 |
| 29 | 2 |
| 30 | 1 |
| 31 | 3 |
| 32 | 9 |

| BEFORE SORTING | | | |
|---|---|---|---|
| SUB1 | SUB2 | SUB3 | SUB4 |
| 1 | | | |
| 6 | | | |
| 5 | | | |
| 4 | | | |
| 5 | | | |
| 9 | | | |
| 2 | | | |
| 3 | | | |
| | 5 | | |
| | 7 | | |
| | 9 | | |
| | 6 | | |
| | 7 | | |
| | 5 | | |
| | 7 | | |
| | 8 | | |
| | | 0 | |
| | | 1 | |
| | | 5 | |
| | | 6 | |
| | | 7 | |
| | | 3 | |
| | | 8 | |
| | | 2 | |
| | | | 4 |
| | | | 6 |
| | | | 8 |
| | | | 7 |
| | | | 2 |
| | | | 1 |
| | | | 3 |
| | | | 9 |

FIG. 8C

| AFTER SORTING | | | |
|---|---|---|---|
| SUB1 | SUB2 | SUB3 | SUB4 |
| 1 | 5 | 0 | 1 |
| 2 | 5 | 1 | 2 |
| 3 | 6 | 2 | 3 |
| 4 | 7 | 3 | 4 |
| 5 | 7 | 5 | 6 |
| 5 | 7 | 6 | 7 |
| 6 | 8 | 7 | 8 |
| 9 | 9 | 8 | 9 |

FIG. 8D

| NO | SORTED DATA | SUB NAME |
|---|---|---|
| 1 | 0 | SUB3 |
| 2 | 1 | SUB1 |
| 3 | 1 | SUB3 |
| 4 | 1 | SUB4 |
| 5 | 2 | SUB1 |
| 6 | 2 | SUB3 |
| 7 | 2 | SUB4 |
| 8 | 3 | SUB1 |
| 9 | 3 | SUB3 |
| 10 | 3 | SUB4 |
| 11 | 4 | SUB3 |
| 12 | 4 | SUB4 |
| 13 | 5 | SUB1 |
| 14 | 5 | SUB1 |
| 15 | 5 | SUB2 |
| 16 | 5 | SUB2 |
| 17 | 5 | SUB3 |
| 18 | 6 | SUB1 |
| 19 | 6 | SUB2 |
| 20 | 6 | SUB3 |
| 21 | 6 | SUB4 |
| 22 | 7 | SUB2 |
| 23 | 7 | SUB2 |
| 24 | 7 | SUB2 |
| 25 | 7 | SUB3 |
| 26 | 7 | SUB4 |
| 27 | 8 | SUB2 |
| 28 | 8 | SUB3 |
| 29 | 8 | SUB4 |
| 30 | 9 | SUB1 |
| 31 | 9 | SUB2 |
| 32 | 9 | SUB4 | ns
PARALLEL MERGE SORTING APPARATUS WITH AN ACCELERATED SECTION

This application is a Divisional of U.S. patent application Ser. No. 08/398,777, filed Mar. 6, 1995, now U.S. Pat. No. 5,727,200.

BACKGROUND OF THE INVENTION

1. Field of the Invention

This invention relates to a data sorting apparatus utilized in a CAD system, a game machine or the like using three-dimensional graphics or the like, and more particularly to a sorting apparatus capable of inputting and outputting base axis data of three-dimensional images in synchronism with a video rate (a frame switching rate).

2. Description of the Related Art

JP-A-2-224018 describes a prior art method relating to an apparatus for sorting base axis data of three-dimensional images. According to this method, for the purpose of sorting a plurality of data at high speed, a base axis data memory, a data number pointer, a first buffer memory, a last buffer memory, a chain buffer memory and a sorting control circuit for controlling data writing and reading in and from the individual memories are provided. Data transfer operation is repeated twice, that is, data transfer of inputted base axis data to the first buffer memory, the last buffer memory and the chain buffer memory and data transfer from the first buffer memory and the last buffer memory to the chain buffer memory are repeated for sorting the base axis data, so that the number of times of data transfer can be decreased, and the data sorting can be carried out at high speed.

In the case of the prior art sorting method, it has been difficult to sort a large quantity of base axis data at the video rate. That is, according to the prior art sorting method, the desired sorting cannot be executed until all the base axis data are inputted. Also, the sorted base axis data cannot be outputted until sorting of all the data is completed. Therefore, even in the case of sorting a train of base axis data supplied as an input; three phases: a first phase of inputting the base axis data; a second phase of sorting the base axis data and a third phase of outputting the sorted base axis data in the sorted order have been required, and a considerable period of time is consumed until the base axis data are outputted in the sorted order after all the base axis data are inputted.

An apparatus capable of realtime sorting of base axis data in conformity with the rate of supplying the base axis data as its input has been considered. However, since the scale of such an apparatus tends to become large due to, for example, the requirement for a large number of memories, it is considerably difficult to put such an apparatus into practical use when the number of base axis data to be sorted is quite large.

SUMMARY OF THE INVENTION

Therefore, it is an object of the present invention to provide a sorting apparatus, not large in scale, in which, all of base axis data supplied as its input are sorted in order, at the same time that the sorted base axis data are outputted in the sorted order.

The sorting apparatus of the present invention which solves the prior art problem comprises a plurality of sorter sections, a base axis data train divider section for supplying partial base axis data trains to these sorter sections, and a comparative result output section for merge/sorting (comparatively selecting) the results of sorting of the individual partial base axis data trains in the plural sorter sections and sequentially outputting the sorted ones of the base axis data in the sorted order.

Thus, in the sorting apparatus of the present invention having the above structure, base axis data are divided into a plurality of partial base axis data trains, and, after the partial base axis data trains are partially concurrently sorted in the plural sorter sections, the base axis data are sequentially outputted from the comparative result output section in the sorted order.

BRIEF DESCRIPTION OF THE DRAWINGS

FIGS. 8A to 8D illustrate the operation of the sorting apparatus of the present invention.

DESCRIPTION OF THE PREFERRED EMBODIMENTS

Preferred embodiments of the present invention will now be described by reference to the drawings.

Figure 1:
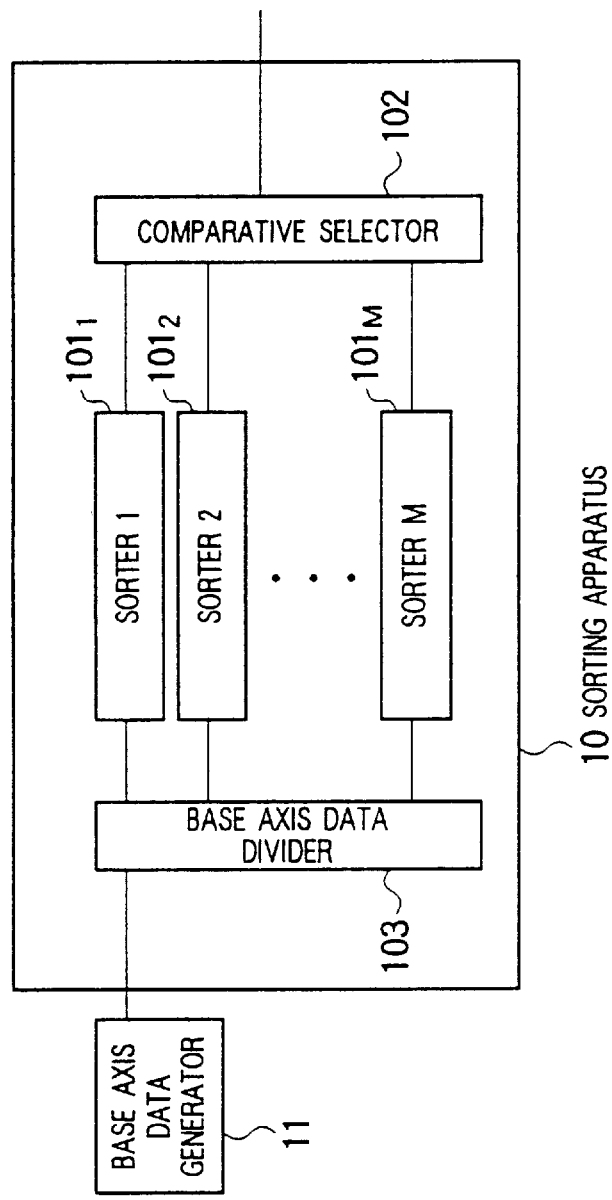
FIG. 1 is a circuit block diagram of an embodiment of the sorting apparatus of the present invention.

FIG. 1 is a block diagram showing the structure of an embodiment of the sorting apparatus 10 of the present invention. Referring to FIG. 1, the sorting apparatus 10 is an apparatus which sorts a base axis data train $\{a(i)\}$, where: $1 \leq i \leq N$, sequentially supplied from a base axis data generator 11 and outputs a sorted base axis data train $\{a'(i)\}$ in the order of from a'(1) to a'(N).

The sorting apparatus 10 comprises a base axis data train divider section 103, a plurality of (M) sorter sections $101_1$, $101_2$, ..., $101_M$, and a comparative selector section 102. Various sorting methods may be used in the sorter sections $101_1$, $101_2$, ..., $101_M$. For example, the method called the frequency sorting method or the so-called distribution count sorting method may be used. The latter sorting method is described in detail in a book entitled "Dictionary of Newest Algorithm According to C Language" written by Haruhiko Okumura and published by Gijutsu Hyoron Company. The comparative selector section 102 is a circuit for executing merge/sorting. The term "merge/sort" is described in the book cited above.

In the base axis data train divider section 103, the base axis data train $\{a(i)\}$ is divided into M partial base axis data trains $\{s(x, i)\}$, where:

$$1 \leq x \leq M, \quad 1 \leq i \leq i_x, \quad \sum_{x=1}^{M} i_x = N$$

Then, the M partial base axis data trains $\{s(x,i)\}$ are sorted by the M sorter sections ($10_1$ to $101_M$) respectively to provide the sorted base axis data trains $\{s'(x,i)\}$. The sorted base axis data trains $\{s'(x,i)\}$ are then subjected to the process of merge/sorting in the comparative selector section 102, and the sorted data are sequentially outputted from the comparative selector section 102.

The practical sorting operation will now be described by referring to FIGS. 8A to 8D. FIG. 8A shows data sequentially outputted from the base axis data generator 11 and illustrates the case where 32 serial data are inputted to the sorting apparatus 10. Although the decimal notation is used herein for the sake of simplicity, it is apparent that actually one data is represented by several binary bits. This description refers to the case where the symbol M in the M sorter sections shown in FIG. 1 is 4. The inputted 32 data are supplied at a rate of 8 to each of the sorter sections 1, 2, 3 and 4 shown in FIG. 1. The data supplied to the sorter sections 1, 2, 3 and 4 are expressed as SUB1, SUB2, SUB3 and SUB4 respectively in FIG. 8B. The data fetched by the sorter sections 1, 2, 3 and 4 as shown in FIG. 8B are sorted in each of the sorter sections 1, 2, 3 and 4, and the sorted data are stored in each of the sorter sections 1, 2, 3 and 4 as shown in FIG. 8C. The comparative selector section 102 compares the sorted data stored in the sorter sections 1, 2, 3 and 4, and the data are outputted from the comparative selector section 102 from a smallest value to a largest value. When the stored data have the same value, the data are outputted in the inputted order. FIG. 8D shows the sorted data. The column designated as SUB Name at the right-hand part of FIG. 8D indicates the name of the data read out from the sorter sections 1, 2, 3 and 4.

Figure 2:
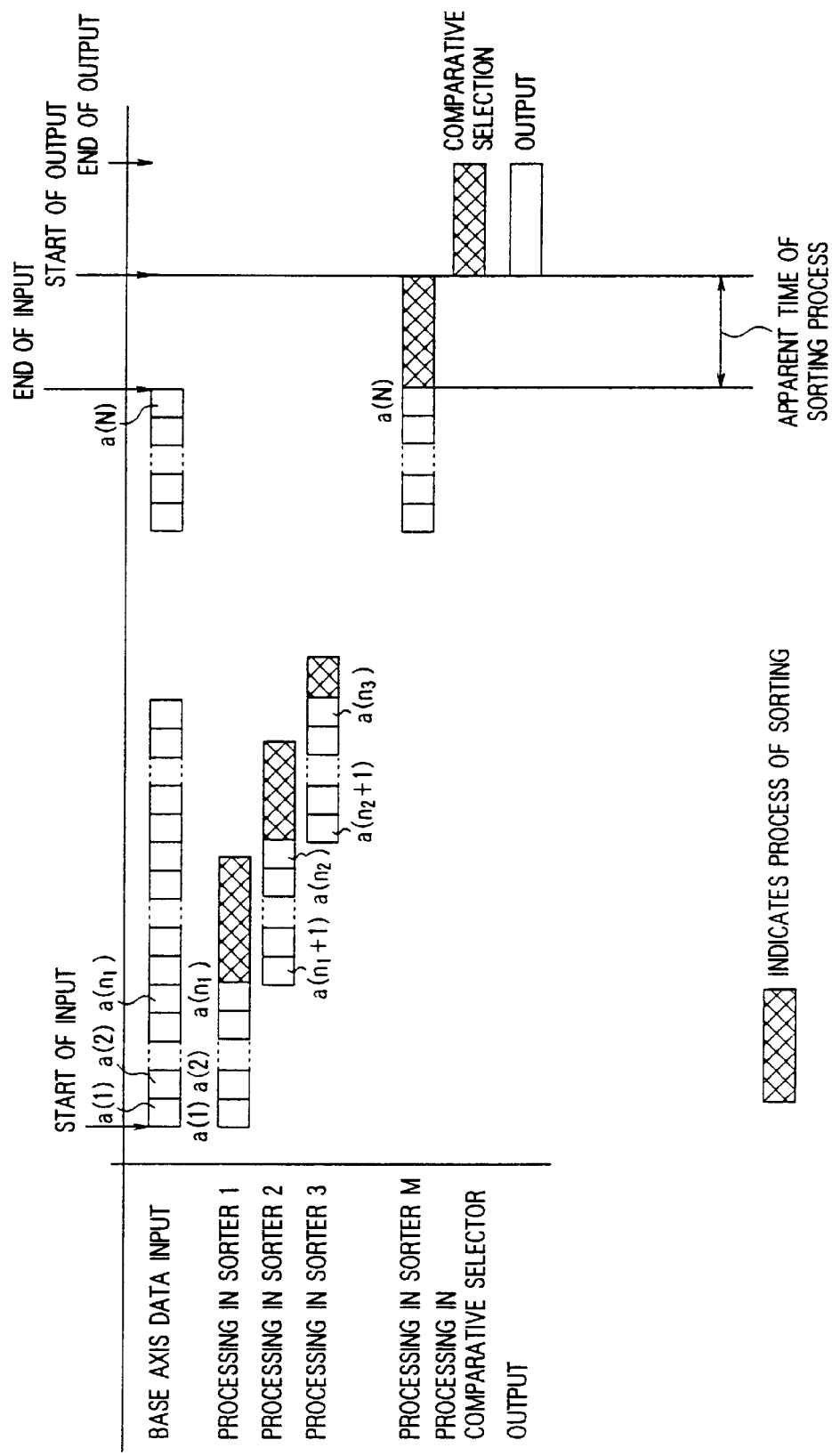
FIG. 2 is a schematic diagram illustrating the operating principle of the embodiment of the sorting apparatus of the present invention.

FIG. 2 is a timing chart showing the timing of inputting, sorting and outputting a base axis data train when the original base axis data train is divided by the base axis data train divider section 103 into partial base axis data trains $\{s(x,i)\}$ in the form of continuous partial data trains of the original base axis data train, and the individual sorter sections ($101_1$ to $101_M$) execute sorting as soon as the required base axis data are assorted. The partial base axis data trains $\{s(x,i)\}$ described above consist of the following partial data trains:

$$a(n_{x-1}+1), a(n_{x-1}+2), \ldots, a(n_x)$$

Because each of the sorter sections starts its sorting operation as soon as the required base axis data are assorted, and the number of data handled by each of the sorter sections is small, the apparent period of time required for sorting, that is, the period of time required until the apparatus starts to output the sorted data after all the base axis data in the train are inputted becomes shorter than before.

All the sorter sections ($101_1$ to $101_M$) shown in FIG. 1 need not necessarily operate according to the same algorithm and sorting method, and the number of elements of the partial base axis data train supplied to each of the sorter sections need not necessarily be the same. However, in the case of FIG. 2, the sorter section handling the base axis data nearer to the last part of the base axis data train $\{a(i)\}$ exerts a greater influence on the apparent period of time required for sorting. Thus, the apparent period of time required for sorting becomes shorter when the processing ability of the sorter section handling the partial base axis data train nearer to the last part of $\{a(i)\}$ is selected to be higher, and the number of data to be handled is selected to be smaller. Therefore, the apparent period of time required for sorting can be shortened when, at the time of dividing the base axis data train by the base axis data train divider section 103, the number of data of the partial base axis data train handled by the sorter section $101_M$ is selected to be smaller than that of the other partial base axis data trains.

Figure 3:
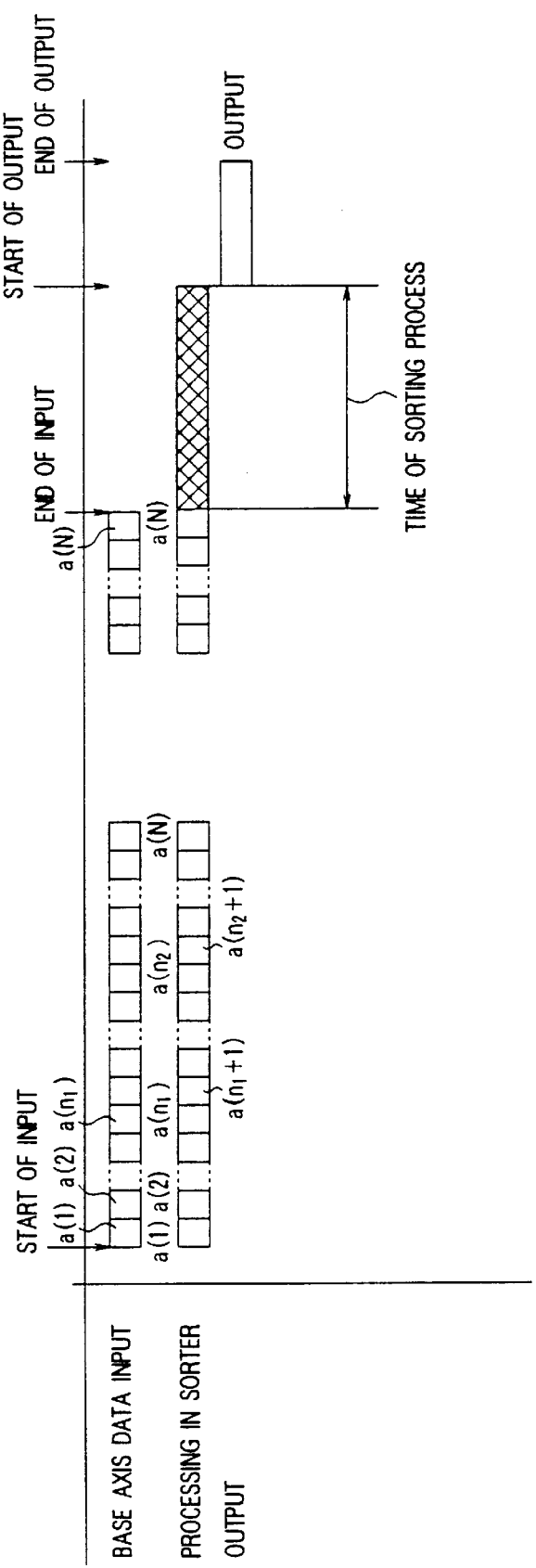
FIG. 3 is a schematic diagram illustrating the operating principle of a prior art sorting apparatus.

FIG. 3 is a timing chart showing a process flow diagram of inputting, sorting and outputting a base axis data train in a prior art sorting apparatus. Because sorting is started after all of a large quantity of base axis data are inputted, the period of time required until the sorted data are outputted after the base axis data are inputted becomes very long. The difference between the period of time required for sorting by the sorting apparatus according to the present invention and that by the prior art sorting apparatus becomes greater with the increase in the number of data.

Figure 4:
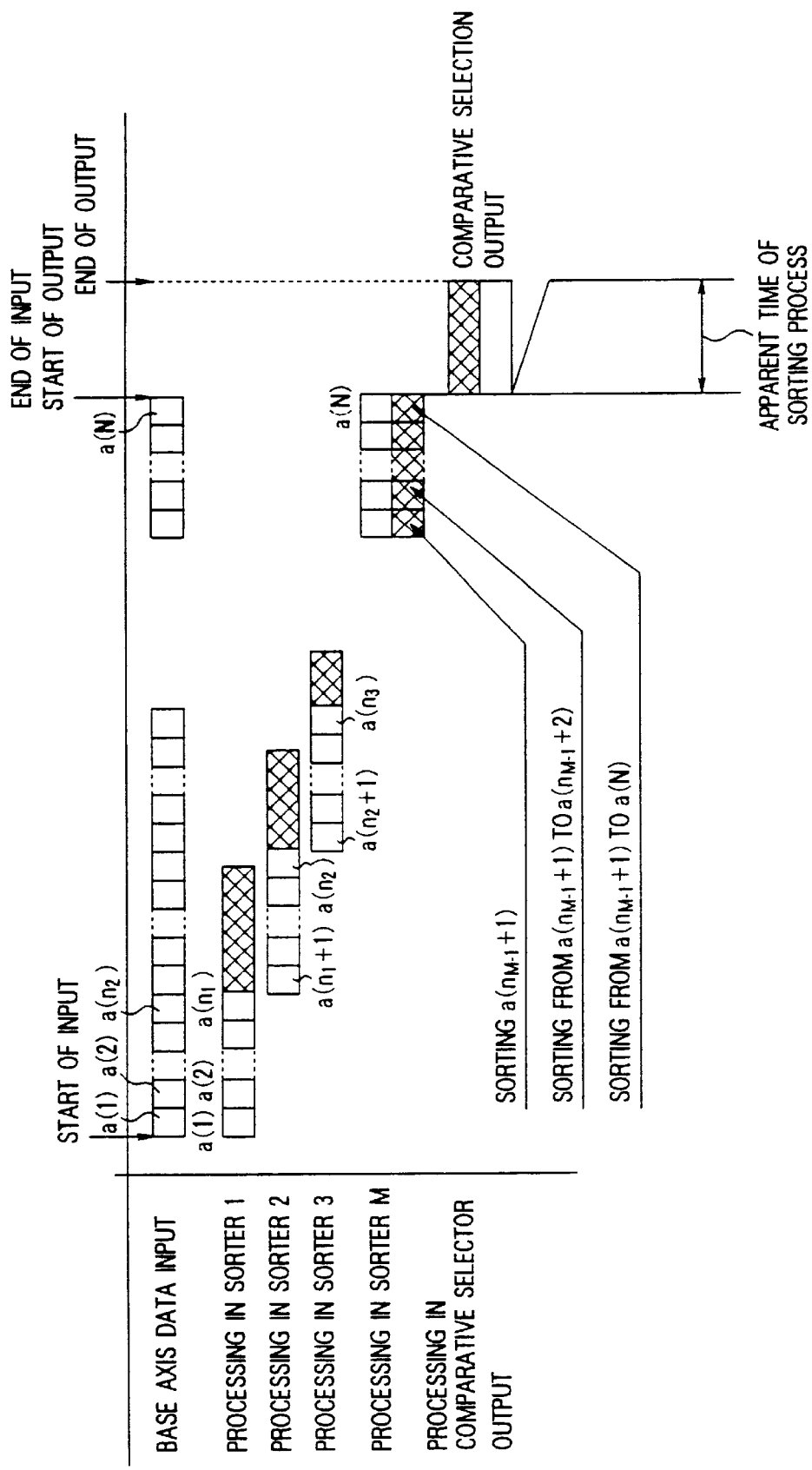
FIG. 4 is a schematic diagram illustrating the operating principle of another form of the embodiment of the sorting apparatus of the present invention.

FIG. 4 shows a flow diagram of inputting, sorting and outputting a base axis data train when the sorter section $101_M$ handling the last partial base axis data train $\{s(M,i)\}$ of the base axis data train $\{a(i)\}$ is selected to differ from the other sorter sections ($101_1$ to $101_{M-1}$), and when sorting means having a high processing ability for dealing with the number of base axis data smaller than that handled by the sorter sections ($101_1$ to $101_M$) is employed, that is, sorting means which, when one base axis data is inputted, adds the newly inputted base axis data to the base axis data inputted and sorted already so as to execute realtime sorting of the base axis data input. Because the last stage executes almost realtime sorting, sorting by the sorter section M is executed at very high speed. Therefore, when the other sorter sections ($101_1$ to $101_{M-1}$) have completed sorting before the sorter section $101_M$ completes sorting, the sorted base axis data can be outputted in a relation almost simultaneous with the end of the process for inputting the base axis data train.

Figure 5:
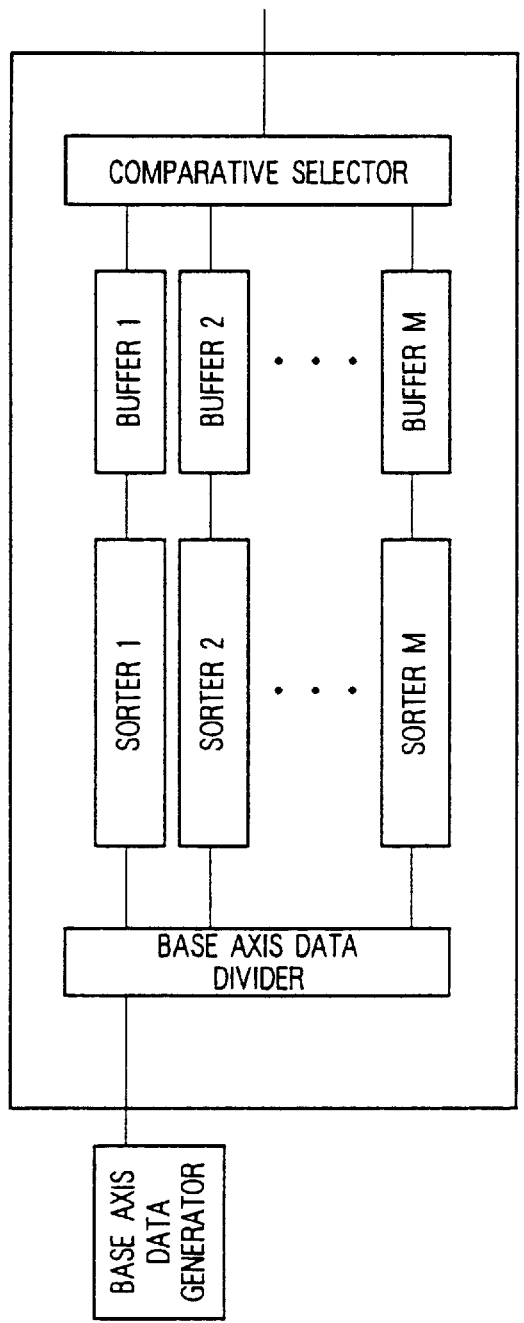
FIG. 5 is a circuit block diagram of another embodiment of the sorting apparatus of the present invention.

FIG. 5 shows the structure of a modification of the sorting apparatus of the present invention. Referring to FIG. 5, a buffer 1 to a buffer M are connected to the outputs of the sorter sections $101_1$ to $101_M$ to store the sorted partial base axis data trains. The results of sorting by the individual sorter sections $101_1$ to $101_M$, that is, the sorted partial base axis data trains $\{s'(x,i)\}$ are stored in buffer 1 to buffer M respectively. Therefore, as soon as the sorter sections $101_1$ to $101_M$ have completed sorting, inputting and sorting of the next new base axis data train supplied from the base axis data generator 11 can be started. Because the period of time required for waiting for inputting of the next new base axis data is short, base axis data trains sequentially supplied at the video frame rate to be sequentially sorted can be continuously sorted.

Figure 6:
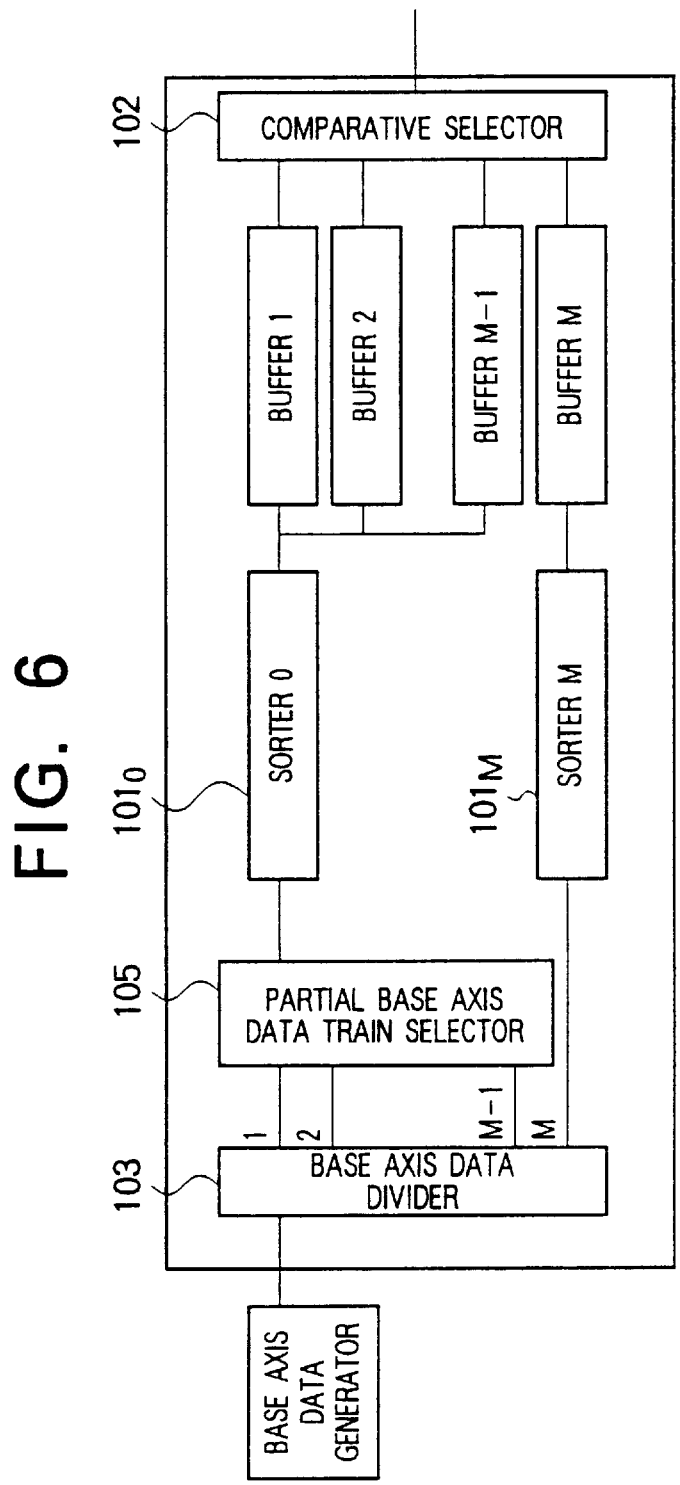
FIG. 6 is a circuit block diagram of still another embodiment of the sorting apparatus of the present invention.

FIG. 6 shows the structure of another modification in which one sorter section $101_0$ executes sorting of a plurality of partial base axis data trains so as to decrease the number of the sorter sections and to reduce the size of the sorting apparatus. Thus, when buffers and a partial base axis data train selector section 105 are provided as shown, the sorter section can be used in common to the data sorting. The partial base axis data train selector section 105 may merely be a data selector or may include a function of buffering the partial base axis data trains. In an actual form of this embodiment, the sorter section 0 may be executed by a software, and the sorter section sorting the partial base axis data train in the last stage which is a critical path of the total sorting time may be formed of an exclusive sorter circuit that is a hardware, so that the overall process of sorting can be achieved at high speed. Although such an exclusive circuit is provided to form the sorter section sorting the partial base axis data train in the last stage M only in the illustrated embodiment, an exclusive circuit forming a plurality of sorter sections in the last stage may be provided.

Figure 7:
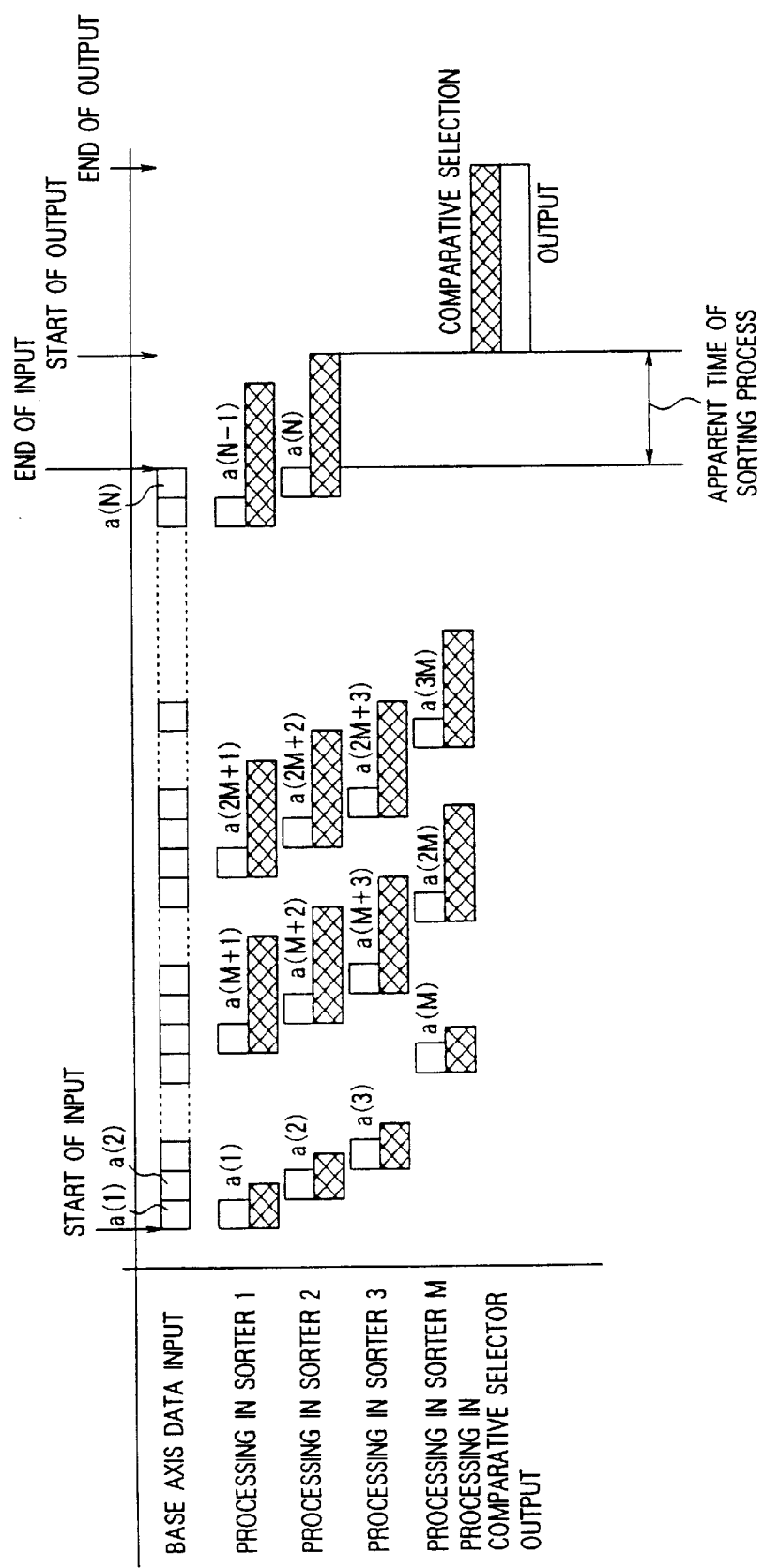
FIG. 7 is a schematic diagram illustrating the operating principle of the sorting apparatus shown in FIG. 6.

FIG. 7 shows a flow diagram of inputting, sorting and outputting base axis data in the embodiment of the sorting apparatus shown in FIG. 1 when the algorithm is such that the partial base axis data trains outputted from the base axis data train divider section 103 are given by $\{T(x,i)\}$ where:

$1 \leq x \leq M, 1 \leq i \leq i_x,$ and $T(x,i)=a(jM+k),$ where $0 \leq k \leq M$ and, each time one base axis data is inputted to the sorter sections 101, this data is inserted in the sorted data trains for the execution of sorting. That is, FIG. 7 illustrates that the embodiment employs a method according to which the sorting process is sequentially allocated to the M sorter sections in the order of inputted data.

When the above algorithm is adopted, the period of time required for sorting becomes long in proportion to the quantity of data to be processed, and, when the quantity of data in the base axis data train exceeds a limit, the sorting process will not follow up the rate of inputting the base axis data. When the partial base axis data trains $\{T(x,i)\}$ are formed in the manner described above, the time interval of inputting the base axis data to the individual sorter sections is once per M times and is thus extended. Therefore, the number of data that can be sorted can be increased as compared to the case where the continuous partial base axis data trains $\{s(x,i)\}$ are inputted to the individual sorter sections.

It will be understood from the above description that the present invention provides a sorting apparatus in which all of base axis data supplied as its input are sorted in order, and, at the same time, the sorted base axis data are outputted in the sorted order.

We claim:

1. A sorting apparatus comprising:
   a data train divider/selector section for receiving a number of data consecutively in the form of a data train and for dividing and placing the data of said data train into partial data trains while receiving said data train;
   first and second sorter sections for sorting the partial data trains output from said data train divider/selector section;
   said data train divider/selector section selectively supplying the partial data trains except for at least the last partial data train to said first sorter section in a received order and supplying said at least the last partial data train to said second sorter section;
   a plurality of buffers each for temporarily storing respective one of the partial data trains output from said first sorter section; and
   a comparative selector section for comparing, sorting and merging data in the partial data trains output from said plurality of buffers and said at least the last partial data train sorted by said second sorter section into a sorted data train.

2. A sorting apparatus according to claim 1, wherein said data train divider/selector section includes a plurality of data buffers each for temporarily storing respective one of the partial data trains.

3. A sorting apparatus according to claim 1, wherein said first sorter section is constructed of software and said second sorter section is constructed of hardware.

4. A sorting apparatus according to claim 3, wherein said second sorter section includes one portion for sorting the last partial data train and another portion for sorting the last but one partial data train.

5. A sorting apparatus according to claim 4, further comprising:
   two additional buffers for temporarily storing the last partial data train output from said one portion and the last but one partial data train output from said another portion of said second sorter section, respectively.

6. A sorting apparatus comprising:
   a data train divider section for receiving a number of data consecutively in the form of a data train and for dividing and placing the data of said data train into partial data trains while receiving said data train;
   a plurality of sorter sections for sorting the partial data trains output from said data train divider section, said plurality of sorter sections including one portion for sorting the last partial data train and another portion for sorting and buffering the other partial data trains consecutively; and
   a comparative selector section for comparing, sorting and merging data in the partial data trains output from said plurality of sorter sections into a sorted data train.

7. A sorting apparatus comprising:
   data train divider/selector means for receiving a number of data consecutively in the form of a data train and for dividing and placing the data of said data train into partial data trains while receiving said data train;
   first and second sorter means for sorting the partial data trains output from said data train divider/selector means;
   said data train divider/selector means selectively supplying the partial data trains except for at least the last partial data train to said first sorter means in a received order and supplying said at least the last partial data train to said second sorter means;
   a plurality of buffer means each for temporarily storing respective one of the partial data trains output from said first sorter means; and
   a comparative selector means for comparing, sorting and merging data in the partial data trains output from said plurality of buffer means and said at least the last partial data train sorted by said second sorter means into a sorted data train.

8. A sorting apparatus according to claim 7, wherein said data train divider/selector means includes a plurality of data buffers each for temporarily storing respective one of the partial data trains.

9. A sorting apparatus according to claim 7, wherein said first sorter means is constructed of software and said second sorter means is constructed of hardware.

10. A sorting apparatus according to claim 9, wherein said second sorter means includes one portion for sorting the last partial data train and another portion for sorting the last but one partial data train.

11. A sorting apparatus according to claim 10, further comprising:
    two additional buffer means for temporarily storing the last partial data train output from said one portion and the last but one partial data train output from said another portion of said second sorter means, respectively.

12. A sorting apparatus comprising:
    data train divider means for receiving a number of data consecutively in the form of a data train and for dividing and placing the data of said data train into partial data trains while receiving said data train;
    a plurality of sorter means for sorting the partial data trains output from said data train divider means, said plurality of sorter means including one portion for sorting the last partial data train and another portion for sorting and buffering the other partial data trains consecutively; and
    comparative selector means for comparing, sorting and merging data in the partial data trains output from said plurality of sorter means into a sorted data train.

* * * * *